US007295200B2

(12) United States Patent
Cameron et al.

(10) Patent No.: US 7,295,200 B2
(45) Date of Patent: Nov. 13, 2007

(54) COMPUTER GENERATED HOLOGRAM DISPLAY SYSTEM

(75) Inventors: Colin D Cameron, Malvern (GB); Peter C Cowling, Malvern (GB)

(73) Assignee: F. Poszat HU, LLC, Wilmington, DE (US)

( * ) Notice: Subject to any disclaimer, the term of this patent is extended or adjusted under 35 U.S.C. 154(b) by 378 days.

(21) Appl. No.: 10/415,958

(22) PCT Filed: Nov. 5, 2001

(86) PCT No.: PCT/GB01/04882

§ 371 (c)(1),
(2), (4) Date: May 7, 2003

(87) PCT Pub. No.: WO02/39389

PCT Pub. Date: May 16, 2002

(65) Prior Publication Data

US 2004/0027345 A1 Feb. 12, 2004

(30) Foreign Application Priority Data

Nov. 7, 2000 (GB) .................................. 0027132.0

(51) Int. Cl.
G06T 15/00 (2006.01)
G06T 17/20 (2006.01)
G03H 1/08 (2006.01)
G03H 1/26 (2006.01)

(52) U.S. Cl. .................. 345/419; 345/423; 359/9; 359/23

(58) Field of Classification Search ............... 345/419, 345/423, 645; 359/9, 23
See application file for complete search history.

(56) References Cited

U.S. PATENT DOCUMENTS

| 4,408,277 | A | * | 10/1983 | Cortellini et al. | ........... 345/419 |
| 4,695,973 | A | * | 9/1987 | Yu | .............. 708/816 |
| 5,056,039 | A | * | 10/1991 | Caulfield | ..................... 706/40 |
| 5,107,444 | A | | 4/1992 | Wu | |

(Continued)

FOREIGN PATENT DOCUMENTS

WO  99/39308 A  8/1999

OTHER PUBLICATIONS

Ichioka et al., "Optical information processing", Proceedings of the IEEE, vol. 84, Issue 5, pp. 674-719, May 1996.*

(Continued)

Primary Examiner—Ulka Chauhan
Assistant Examiner—Roberta Prendergast
(74) Attorney, Agent, or Firm—Stolowitz Ford Cowger LLP

(57) ABSTRACT

A method of displaying a computer generated hologram includes displaying the image as a set of facets that approximated to the true shape of the object to be displayed. Each of these facets is populated with points that together make up the image. The invention provides a number of array structures that allow adjoining facets at different orientations and angles to be populated with point without creating areas around the join of either point overpopulation or point underpopulation, and so results in a higher quality image. The invention is mainly applicable for producing interference base Computer Generated Holograms, but can also be used in other types of 3D display that make up objects from an array of points.

8 Claims, 3 Drawing Sheets

U.S. PATENT DOCUMENTS

Figure 1:
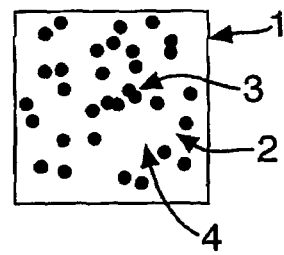

| | | | | |
|---|---|---|---|---|
| 5,119,214 | A | * | 6/1992 | Nishii et al. .................... 359/7 |
| 5,132,839 | A | * | 7/1992 | Travis ......................... 359/462 |
| 5,194,971 | A | * | 3/1993 | Haines ........................... 359/9 |
| 5,220,622 | A | * | 6/1993 | Scarr .......................... 382/210 |
| 5,534,704 | A | * | 7/1996 | Robinson et al. ........... 250/550 |
| 5,701,138 | A | * | 12/1997 | Othmer et al. .............. 345/698 |
| 5,739,930 | A | * | 4/1998 | Sato et al. ..................... 359/23 |
| 5,740,342 | A | * | 4/1998 | Kocberber .................. 345/420 |
| 5,742,293 | A | * | 4/1998 | Koyamada et al. ......... 345/421 |
| 5,805,783 | A | * | 9/1998 | Ellson et al. ............... 345/468 |
| 5,850,300 | A | * | 12/1998 | Kathman et al. .............. 359/9 |
| 5,923,331 | A | * | 7/1999 | Dusseux et al. ............ 345/421 |
| 5,982,954 | A | * | 11/1999 | Delen et al. ................. 382/294 |
| 6,195,184 | B1 | * | 2/2001 | Chao et al. .................... 359/32 |
| 6,256,038 | B1 | * | 7/2001 | Krishnamurthy ............ 345/419 |
| 6,262,737 | B1 | * | 7/2001 | Li et al. ...................... 345/419 |
| 6,269,170 | B1 | * | 7/2001 | Horikoshi et al. .......... 382/100 |
| 6,271,856 | B1 | * | 8/2001 | Krishnamurthy ............ 345/581 |
| 6,396,496 | B1 | * | 5/2002 | Pfister et al. ................ 345/427 |
| 6,437,919 | B1 | * | 8/2002 | Brown et al. ................ 359/621 |
| 6,448,968 | B1 | * | 9/2002 | Pfister et al. ................ 345/423 |
| 6,480,190 | B1 | * | 11/2002 | Pfister et al. ................ 345/419 |
| 6,498,607 | B1 | * | 12/2002 | Pfister et al. ................ 345/423 |
| 6,542,157 | B1 | * | 4/2003 | Browne ....................... 345/441 |
| 6,595,644 | B2 | * | 7/2003 | Kostrzewski et al. ........... 353/7 |
| 6,721,101 | B2 | * | 4/2004 | Daniell ........................ 359/626 |
| 6,847,485 | B2 | * | 1/2005 | Kathman et al. ............ 359/599 |
| 6,853,373 | B2 | * | 2/2005 | Williams et al. ............ 345/419 |
| 6,975,457 | B1 | * | 12/2005 | Greenaway et al. ........ 359/565 |
| 2002/0018299 | A1 | * | 2/2002 | Daniell ........................ 359/622 |
| 2002/0034006 | A1 | * | 3/2002 | Kostrzewski et al. ....... 359/443 |

OTHER PUBLICATIONS

Lucente, M. and Galyean, T. A. 1995. Rendering interactive holographic images. In Proceedings of the 22nd Annual Conference on Computer Graphics and interactive Techniques S. G. Mair and R. Cook, Eds. SIGGRAPH '95. ACM Press, New York, NY, 387-394.*

Lucente, M, "Holographic bandwidth compression using spatial subsampling", Optical Engineering, SOC. of Photo-optical Instrumentation Engineering, vol. 35, No. 6, Jun. 1996, pp. 1529-1537, XP000630859.*

Lucente, M, 1997, "Interactive three-dimensional holographic displays: seeing the future in depth", SIGGRAPH Comput. Graph. 31, 2 (May 1997), 63-67.*

Plesniak et al., 1998, "Coincident display using haptics and holographic video", Proc. of SIGCHI Conf. on Human Factors in Computing Systems, C. Karat, A. Lund, J. Coutaz, & J. Karat, Eds., ACM Press/Addison-Wesley Pub. Co., NY, NY, pp. 304-311.*

Soferman, Z. et al., "Advanced graphics behind medical virtual reality: evolution of algorithms, hardware, and software interfaces", Proceedings of the IEEE, vol. 86, Issue 3, Mar. 1998, pp. 531-554.*

Sclaroff, S.; Pentland, A.P.; "On modal modeling for medical images: underconstrained shape description and data compression", Proceedings of the IEEE Workshop on Biomedical Image Analysis, Jun. 24-25, 1994, pp. 70-79.*

Penner et al; Three Dimensional Data Manipulatin and Representation for Accurate and Realistic Data Visualization° Systems, Man and Cybernetics, 1995, Intelligent Systems for the $21^{st}$ Century, IEEE Internatinal Conference on Vancouver, BC, Canada, Oct. 22-25, 1995, New York, NY, USA IEEE, US, Oct. 22, 1995, pp. 1091-1096, XP010194420.

Dudgeon et al; "Fractal-Based Modeling of 3D Terrain Surfaces"; Southeastcon '96. Bringing Together Education, Science and Technology, Proceedings of the IEEE Tampa, FL, USA, Apr. 11-14, 1996, New York, NY, USA, IEEE, US, Apr. 11, 1996, pp. 246-252, XP010163681.

Cameron et al; "Computational Challenges of Emerging Novel True 3D Holographic Displays"; Critical Technologies For the Future of Computing, San Diego, CA, USA, Jul. 31-Aug. 4, 2000, vol. 4109, pp. 129-140, XP008000305.

Article; "2000-A Holographic Odyssey"; Eureka, Feb. 2001, pp. 20-21.

Penner et al; "Three Dimensional Data Manipulatin and Representation for Accurate and Realistic Visualization" Systems, Man and Cybernetics, 1995, Intelligent Systems for the $21^{st}$ Century, IEEE Internatinal Conference on Vancouver, BC, Canada, Oct. 22-25, 1995, New York, NY, USA IEEE, US, Oct. 22, 1995, pp. 1091-1096, XP010194420.

* cited by examiner

COMPUTER GENERATED HOLOGRAM DISPLAY SYSTEM

This application is the US national phase of international application PCT/GB01/04882, filed Nov. 5, 2001, which designates the US. This application claims priority to and incorporates by reference in entirety the following applications: GB0027132.0, filed on Nov. 7, 2000 and US provisional application 60/247,048, filed Nov. 13, 2000.

This invention relates to a method of, and system for, representing a three dimensional abject for display on a system capable of displaying objects in three dimensions. More specifically, it relates to methods of displaying images comprising of adjoining facets, where each facet is populated, or filled, with points to give the appearance from a distance of a continuous surface.

PRIOR ART

In performing the calculations required to display a computer generated hologram (CGH) using an interference based algorithm, it is necessary to populate the object to be displayed with an array of points that, when seen from a suitable distance, appear as a continuum. These are known as object points. It is usual in computer graphics fields to quantize the object to be displayed into a series of planar facets that approximate to the actual shape. The points that make up the object are populated onto these facets. An observer viewing such an object from a sufficiently large distance will tend to see not the individual points but instead the complete object as if it were drawn with continuous lines or areas of colour. For this to occur there must be a sufficient density of points such that the eye cannot distinguish between adjacent points. The human eye can resolve two points if the angle subtended from the eye to the points is typically greater than one minute of arc (290μ radians). By knowing the minimum eye to object distance likely to arise, a minimum object point population density can be calculated.

The facets themselves will generally be of differing sizes and will abut each other at different angles. If the object has curves, then the smaller these facets are, the closer they are able to provide a true representation of these curved areas. The facets will then be populated with object points. Each of these points forms a basic element of the picture, and taken together, these points make up the object to be displayed.

If it is desired to show part of an image having a continuous surface, there should be no sudden changes in object point population density. On a single facet, there is no problem in obtaining such a uniform density. However, when facets are joined together at different angles, the points will, in general, not flow from one facet to the other and still keep a localised uniform density. This leads to problems of non uniform density of object points across facet boundaries: too high a density will produce a bright area, whereas too low a density will produce a dark area on the object.

STATEMENT OF INVENTION

According to the present invention, there is disclosed a method for representing a three dimensional object in a computer system capable of displaying the object in three dimensions wherein, in use:
  a surface of the object is approximated by a set of planar facets;
  a grid defining a set of nodes is imposed upon each of the facets;
  a point is associated with each node of the grid;
  each point is moved away from its associated node on the plane of the facet;
  the distance and direction of the movement is decided in a random or pseudo random manner;

such that the totality of points is used as the representation of the object.

The current invention discloses an object point arrangement having a grid, wherein the actual object points are not confined to being on the nodes of the grid. It has been found that random perturbations of points from the grid improves the behaviour of points at facet borders. Such a grid arrangement has the characteristic that it can be abutted to other orientations of itself whilst only having a minor effect on the point density in the region of the shared edge. Thus one facet having a particular grid orientation can adjoin another facet having a different orientation with little apparent change in point density.

One variation however is that if a substantially equilateral triangular grid is used, such that the apexes of the grid are all approximately equidistant from their six nearest neighbours, a satisfactory behaviour of the points at facet borders is obtained. It is, however, improved upon by adding the perturbations described herein.

The invention therefore provides a way to have the minimal density of points consistent with the resolving abilities of the human eye, yet avoid localised overpopulation or underpopulation of the object surface.

Preferably each grid imposed on each facet has a common origin and orientation relative to the global origin, having rotated the facet into a plane parallel to the display's design plane.

The invention is preferably implemented on a computer generated hologram display system, having a display capable of generating interference based holograms. The display panel itself is referred to in this specification as the CGH Design Plane (CDP).

The method of the current invention may be implemented as a computer program running on a computer system. The program may be stored on a carrier, such as a hard disk system, floppy disk system, or other suitable carrier. The computer system may be integrated into a single computer, or may contain distributed elements that are connected together across a network.

According to another aspect of the invention there is provided a computer generated hologram display system wherein
  a surface of the object is approximated by a set of planar facets;
  a grid of related mathematical origin defining a set of nodes is imposed upon each of the facets;
  a point is associated with each node of the grid;
  each point is moved away from its associated node on the plane of the facet;
  the distance and direction of the movement is decided in a random or pseudo random manner;

such that the totality of points is used as the representation of the object.

Such a display system implements the method as provided for elsewhere in this specification.

DETAILED DESCRIPTION OF THE INVENTION

Embodiments of the invention will now be described in detail, by way of example only, with reference to the accompanying drawings, in which:

FIG. 1 diagrammatically illustrates a single facet populated with random points;

FIG. 2 diagrammatically illustrates at a) a single facet populated with a rectangular array of points, and at b) two neighbouring facets that are each populated with points on rectangular grids that each have different orientations;

FIG. 3 diagrammatically illustrates the importance of maintaining the same grid origin across multiple facets as the facet size decreases.

Figure 4:
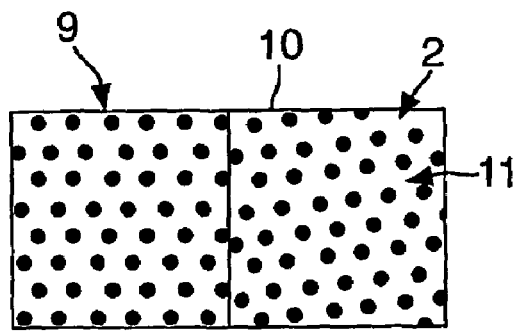

FIG. 4 diagrammatically illustrates one solution to the problem, wherein the mesh grid is laid out in the form of an equilateral triangular matrix.

Figure 5:
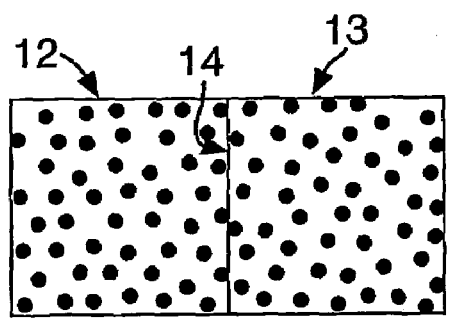

FIG. 5 diagrammatically illustrates an improved mesh arrangement to that of FIG. 4

Figure 6:
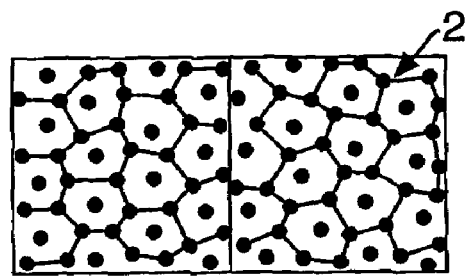

FIG. 6 diagrammatically illustrates the mesh arrangement of the points portrayed in FIG. 5

Figure 7:
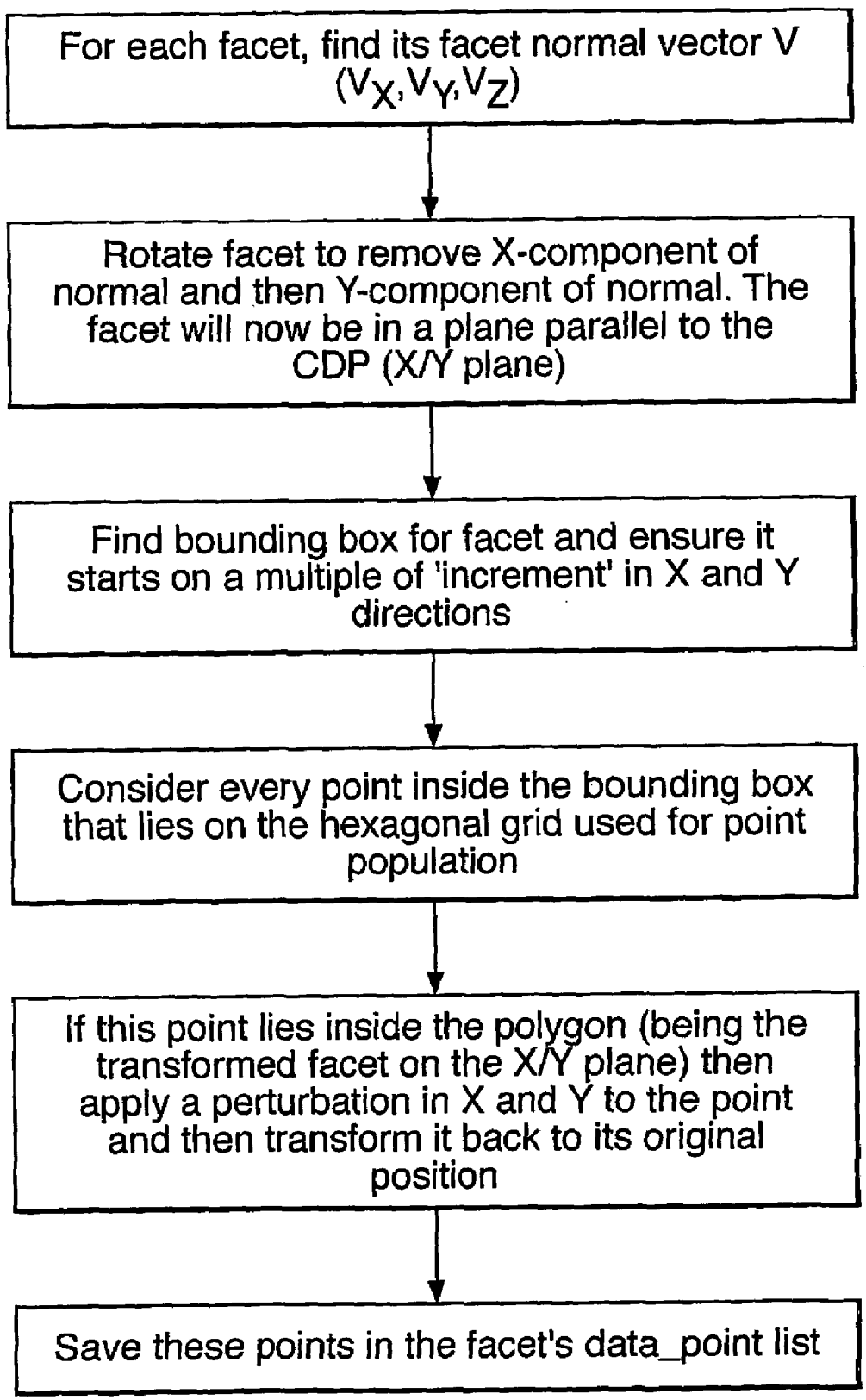

FIG. 7 shows a block diagram of the steps taken by the computer system in implementing the invention.

FIG. 1 shows a single facet 1, as may be used to represent a part of an object, that has been populated with points 2 in a completely random fashion at a point density commensurate with a viewer distance such that in an idealised case the facet appears uniformly opaque. Some apparent clustering of the points can be seen, eg 3, as well as some denuded areas 4. These will show up on the object as an unevenness of brightness of that part of the object. The high density areas will appear to be too bright, and the denuded areas will appear as holes in the object.

Figure 2A:
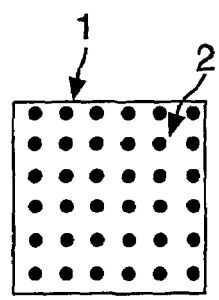
Figure 2B:
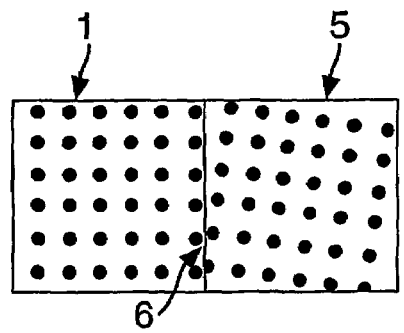

FIG. 2a shows a solution that works over a single facet. The points 2 are arranged in a rectangular mesh that will appear of uniform density if viewed from a sufficient distance. This mesh does not behave so well when neighbouring facets using the same mesh are considered. FIG. 2b shows a typical example of neighbouring facets 1, 5 not lying on the same plane in 3D space that both have a rectangular mesh. In this case, a particularly high density of points is created 6 at the shared boundary of the facets. Equally, if the boundary had been in a different place, an area of sparse density could have been created. Thus a rectangular grid is undesirable.

Figure 3A:
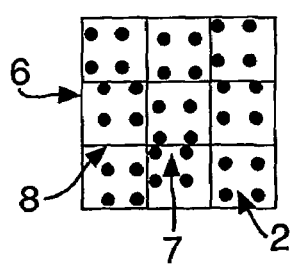
Figure 3B:
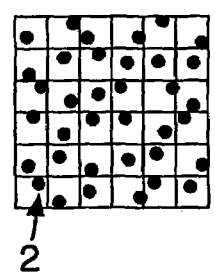
Figure 3C:
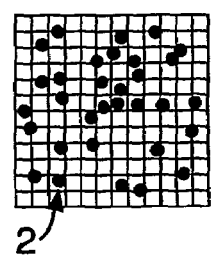

Typically, many of the facets representing an object will be very small. The smaller the facet, the more accurately a curved surface can be represented. There is a tendency, therefore, for the facets that are used to approximate curved surfaces to have only a very few points per facet. At the required point density there can even be no points on a facet if it is small enough. These small facets having very few points have their own problems. FIG. 3a shows a set of nine small facets, each large enough to hold about 4 points. Although each facet (e.g. 6) has a regular grid and all facets share the same orientation, there is still an apparent bunching of the points at certain boundaries (e.g. 7), and a scarcity of points at other boundaries (e.g. 8). This is because the grids do not share a common origin as may be expected in the general case where the facets lie on different planes in 3D space. As facet size decreases the effect is increased (FIG. 3b), until eventually at FIG. 3c the points appear to be randomised, which of course has all the problems as discussed in relation to FIG. 1.

A solution to these problems has been found. FIG. 4 shows one embodiment of the solution. Here, each facet 9, 10 has points laid out on an equilateral triangular grid. A common origin is used to start the grid for each facet. This is achieved by rotating the facet by from its 3D orientation into a plane parallel to the CDP. The grid of points then starts from the global origin in each case. Following population the points are rotated by the inverse of the initial rotation to place them in the appropriate place on the original facet surface. It can be seen in FIG. 4 that when two facets 9, 10, each having such a grid layout, are laid adjacent to each other, the edge effects shown in FIG. 2 are much reduced, and there is very little apparent bunching or grouping of the points 2. For points that are not close to the edge of a facet (e.g. 11), it can be seen that each of these points 11 is equidistant from its six nearest neighbours. This is a consequence of the triangular layout.

Although this gives a good solution to the problem, it has been found that it can be improved upon. If each point on the triangular grid is subjected to a displacement in a random, or pseudo-random direction of a distance randomly or pseudo-randomly chosen within some bound then the edge effects described above are reduced further. A bound of ⅓ times the grid spacing works well in the current application, but the bound can be set to that suitable for the application. Other suitable bounds may be 0.4, or 0.25, or 0.18 times the grid spacing, but the invention is not limited to these. FIG. 5 shows two neighbouring facets 12, 13 with points based on a triangular matrix, but perturbed as described above within a bounding distance of 0.333. The superior behaviour at the edge 14 can be seen.

FIG. 6 shows that, despite first appearances, the points are indeed on a grid that has been distorted as described in the above paragraph.

Note that where FIGS. 1 to 6 represent the facets as having a border, no such border would be there in practice. Also, in practice, the facets lie on an arbitrary plane in 3D space and need not be square, but can have any number of sides, and be irregular in shape. The embodiments currently implemented have used predominantly triangular facets.

FIG. 7 shows a block diagram of the processing steps carried out in one embodiment of the invention. Here, the CDP is taken as having its own "global" hexagonal grid, which is used in the manner described below as the reference grid for each grid imposed on each of the facets. Once the facet has been rotated to be co-planar with the CDP, a bounding box is drawn around the facet such that it is the smallest rectangular box that is on the orientation of the grid that encloses the polygon that is the rotated facet. Points within this box that lie on intersections of the CDP's hexagonal grid are then taken to be object points. These are then perturbed, and then rotated back to the original orientation of the facet.

The current invention has been implemented on an Active-Tiling® Computer Generated Hologram (CGH) display system, though any 3D display system could be used, if it is capable of displaying true 3D images, and uses arrays of points to make up surfaces. The computer system itself could be a standalone unit, or could have remote elements connected by a network.

The Active Tiling system is a means of producing holographic moving images by rapidly replaying different frames of a holographic animation. The Active Tiling system essentially comprises a system for directing light from a light source onto a first spatial light modulator (SLM) means and relaying a number of SLM subframes of the modulated light from the first high speed SLM means onto a second spatially complex SLM. The CGH is projected from this second SLM.

The full CGH pattern is split up into subframes in which the number of pixels is equal to the complexity of the first SLM. These frames are displayed time-sequentially on the first SLM and each frame is projected to a different part of the second SLM. The full image is thus built up on the second SLM over time. The first SLM means comprises an array of the first SLMs that each tile individual subframes on the second SLM over their respective areas.

Light from an SLM in the array must not stray onto parts of the second SLM not intended for it. To prevent this a shutter can be placed between the first SLM means and the second SLM, which masks off those areas of the second SLM that are not currently being written to. Alternatively, electrodes on the second SLM that cover the area where it is not wished to write an image can simply be not provided with a drive voltage. Thus any light that is falling onto the second SLM in these areas has no effect on the modulation layer. This avoids the need for a shutter system. The first SLM of such a system is of a type in which the modulation pattern can be changed quickly, compared to that of the second SLM. Thus its updating frame rate is greater than the read-out frame rate of the second SLM.

The Active Tiling system has the benefit that the image produced at the second SLM, which is addressed at a rate much slower than that of the first SLM array, is effectively governed by the operation of the first SLM. This permits a trade off between the temporal information available in the high frame rate SLMs used in the SLM array and the high spatial resolution that can be achieved using current optically addressed SLMs as the second SLM. In this way, a high spatial resolution image can be rapidly written to an SLM using a sequence of lower resolution images.

See PCT/GB98/03097 for a full explanation of the Active Tiling system.

The invention claimed is:

1. A method of operating a computer generated hologram system for representing a three dimensional object in a computer system and for displaying the object in three dimensions in a form of a computer generated hologram, wherein, in use:
    a surface of the object is approximated by a set of planar facets;
    a grid defining a set of nodes is imposed upon each of the facets;
    an object point is associated with each node of the grid;
    each object point is moved away from its associated node on the plane of the facet;
    the distance and direction of the movement is decided in a random or pseudo random manner; and
    the computer generated hologram is displayed such that a totality of object points is used as the representation of the object, wherein each grid imposed on each facet has a common origin and orientation relative to a global origin having rotated the facet into a plane parallel to the display's design plane.

2. The method as claimed in claim 1 wherein the grid is comprised of equilateral triangles such that each node of the grid is equidistant from each of the six nearest neighbours to that node.

3. The method as claimed in claim 1 wherein the distance of movement of each object point is at most 0.4 times the separation distance between neighbouring nodes of the grid.

4. The method as claimed in claim 1 wherein the distance of movement of each object point is at most 0.333 times the separation distance between neighbouring nodes of the grid.

5. The method as claimed in claim 1 wherein the distance of movement of each object point is at most 0.25 times the separation distance between neighbouring nodes of the grid.

6. The method as claimed in claim 1 wherein the distance of movement of each object point is at most 0.18 times the separation distance between neighbouring nodes of the grid.

7. A method of operating a computer generated hologram system for representing a three dimensional object in a computer system or displaying the object in three dimensions in the form of a computer generated hologram, said computer system having a CGH design plane, said method comprising the steps of:
    approximating a surface of the object by a set of planar facets;
    rotating each of said facets from an original position to a common plane;
    imposing a grid defining a set of nodes upon each of the facets, said grid having a global origin;
    associating an object point with each node of the grid;
    rotating each facet back to its original position, such that a totality of object points comprises the representation of the object; and
    displaying the computer generated hologram.

8. The method as claimed in claim 7 wherein the grid is comprised of equilateral triangles such that each node of the grid is equidistant from each of the six nearest neighbours to that node.

* * * * *

UNITED STATES PATENT AND TRADEMARK OFFICE
CERTIFICATE OF CORRECTION

| | |
|---|---|
| PATENT NO. | : 7,295,200 B2 |
| APPLICATION NO. | : 10/415958 |
| DATED | : November 13, 2007 |
| INVENTOR(S) | : Cameron et al. |

It is certified that error appears in the above-identified patent and that said Letters Patent is hereby corrected as shown below:

On the Title Page, Item -63- please add "US 60/247,048" filed "Nov. 13, 2000" as "Related U.S. Application Data".

Signed and Sealed this

Twenty-ninth Day of September, 2009

David J. Kappos
*Director of the United States Patent and Trademark Office*